Patented May 25, 1948

2,442,055

UNITED STATES PATENT OFFICE 2,442,055

HYDROLYSIS OF PROTEINS

Anthony M. Moos, New York, N. Y., assignor, by mesne assignments, to American Cyanamid Company, New York, N. Y., a corporation of Maine No Drawing. Application April 7, 1945, Serial No. 587,215

5 Claims. (Cl. 260—529)

This invention relates to an improvement in the art of hydrolyzing proteins. More particularly, it relates to an improvement in the acid hydrolysis of proteins to obtain all of the amino acids of the proteinaceous material without loss of tryptophane or formation of humin.

The art of digesting proteinaceous materials with strong mineral acids to obtain amino acids suitable for parenteral administration for therapeutic purposes has been practiced for a long time. It has been generally recognized, however, that during the hydrolysis with strong acids an undesirable brownish-black amorphous precipitate is formed. This material, which is called humin (also melanin), has been found to be a condensation product of an aldehyde and tryptophane, the aldehydes usually occurring as breakdown products of amino acids or carbohydrates which are frequently present with the proteinaceous material. As a result of this condensation, strong acid hydrolysates of proteins are usually lacking in tryptophane. Inasmuch as tryptophane is one of the essential amino acids required for human nutrition, the hydrolysate cannot be used for therapeutic purposes without further modification.

The usual method of making up the tryptophane deficiency of acid hydrolysates of proteins is to add to the digest additional amounts of tryptophane prepared by synthetic means. This, naturally, increases the cost of the product. Another method of minimizing the loss of tryptophane by acid digestion which has been proposed involves the use of a mixture of an acid-digested material and an alkaline digested material, which latter contains tryptophane. Unfortunately, however, the alkaline hydrolyzed proteins are deficient in other amino acids, such as arginine and lysine, which are destroyed during the alkaline hydrolysis, or the amino acids are partially racemized. As will be seen, therefore, the mixed hydrolysate is deficient in tryptophane, arginine and lysine and, in addition, involves the necessity of producing the product by two entirely different methods.

Although various strong mineral acids, such as sulfuric, hydrochloric, hydrobromic, phosphoric and the like, have been used in the acid hydrolysis of proteins, it does not appear that sulfurous acid has been used heretofore for this purpose. This is probably due in part to the high volatility and extreme corrosiveness of sulfurous acid which requires the use of pressure vessels of stainless steel, glass, or other acid-resistant material and in part to the absence of any reason to believe that sulfurous acid would act differently than other known acids in the hydrolysis of proteins. I have discovered, however, that sulfurous acid can be used with advantage to hydrolyze proteins to essential acids and that, most surprisingly, the resulting hydrolysate contains tryptophane in substantially undiminished amounts and is free from humin. Although I have not definitely ascertained the reason for this unusual behavior of sulfurous acid, it may be due to the action of the acid in preventing the reaction of aldehydes with tryptophane to produce humin by formation of aldehyde bisulfite addition compounds.

In carrying out the process of the present invention I prefer to use a complete proteinaceous material; that is, one which, on hydrolysis, yields all of the essential amino acids, including tryptophane. Among such proteinaceous material may be included casein, soy bean protein, beef, liver and liver cake (a by-product from which certain vitamins and other medicinal agents have been previously extracted), lactalbumin, and others. Although zein, glutinin, gelatin and other proteins could be hydrolyzed with sulfurous acid in accordance with my invention, it will not ordinarily be found desirable to do so since these proteins do not contain precursors of tryptophane. As pointed out before, it is one of the principal advantages of the present invention that proteinaceous materials can be hydrolyzed without loss of tryptophane.

As will be apparent, the proteinaceous material to be hydrolyzed with sulfurous acid may contain a mixture of proteins which may or may not be complete in themselves. For example, zein, which does not contain a source of tryptophane, may be mixed with lactalbumin which contains a fairly large amount of potential tryptophane and the resulting hydrolysate will contain all of the essential amino acids. As will be seen, therefore, my invention contemplates the digestion with sulfurous acid of a proteinaceous material containing the precursor of tryptophane and other essential amino acids.

In carrying out the hydrolysis with sulfurous acid, it will be found necessary to conduct the process under pressure in an acid-resistant vessel. The temperature of the hydrolysis may vary from about 100° C. to 180° C., or higher but below the decomposition point of the products in the reaction vessel. Ordinarily, I prefer a temperature of between 120 and 150° C.

The time required for acid hydrolysis will vary considerably, depending upon the temperature, concentration of acid, and, if an acid mixture is used, the nature of the acids in the mixture.

Higher temperatures require less time but, in general, the time of hydrolysis will be from about five hours to seventy-two hours.

The use of sulfurous acid in the hydrolysis of proteins also has important advantages in addition to the fact that tryptophane can be preserved in the presence of sulfurous acid. One of these advantages is that the hydrolysis is conducted in a reducing atmosphere, thus keeping at a minimum the formation of degradation products and resulting in the formation of a lighter colored product. An important advantage is the fact that most of the acid can be removed by subjecting the hydrolysate to a vacuum whereby most of the acid can be removed by volatilization. The remaining small amounts of acid may then be removed by precipitation with lime or other alkaline material in the same way that sulfuric acid and other acids are removed from the conventional mineral acid hydrolysate. I have also found that the sulfurous acid remaining after evacuation may be removed by treatment of the material with suitable ion exchange resins.

Although my experiments have shown that sulfurous acid is a more satisfactory hylroyzing agent for proteins than sulfuric or other conventional acids, my process permits the use of other acids with sulfurous acid if desired. I may for this latter reason reduce the amount of sulfurous acid to about 10% of the total acids required for the hydrolysis. As the total amount of acid may vary from about 50% to 300% or more of the weight of the protein to be digested it will be seen that the minimum amount of sulfur dioxide may be as low as about 5% of the weight of the protein. The remaining acid may be sulfuric, hydrochloric, phosphoric, or other acids which have previously been used in the hydrolysis of proteins.

My invention will now be illustrated in greater detail by means of the following examples in which casein is hydrolyzed with sulfurous acid and with mixtures of sulfurous acid and sulfuric acid. It will be understood, of course, that other proteins may be used as the source of amino acids and that other acids than sulfuric may be used with sulfurous acid in the hydrolysis without sacrificing the important fact that the protein can be hydrolyzed without loss of tryptophane or formation of humin. All parts are by weight unless otherwise indicated.

*Example 1*

5 parts by weight of casein was heated with 125 parts by weight of water and 16 parts by weight of sulfur dioxide between 120° C. and 125° C. for 20 hours in a sealed glass vessel under the autogenously developed pressure. Upon analysis the hydrolyzed casein was found to contain tryptophane and was free of humin. The amino nitrogen-total nitrogen ratio was .625. This experiment shows that proteins can be hydrolyzed with sulfurous acid to yield an amino acid hydrolysate without converting tryptophane to humin.

*Example 2*

5 parts by weight of casein was heated with 25 parts by volume of concentrated (96%) sulfuric acid and 100 parts by weight of water at 120° C. to 125° C. for 20 hours in a sealed glass vessel. Upon analysis the product was found to contain humin but no tryptophane. The amino nitrogen-total nitrogen ratio was .464. This experiment shows that the use of sulfuric acid in the acid hydrolysis of proteins results in the destruction of the tryptophane and leads to the formation of humin. When compared with Example 1 it will be seen that sulfurous acid is a more effective hydrolyzing agent than is sulfuric acid, a higher amino nitrogen-total nitrogen ratio having been obtained in Example 1 under the same conditions of time and temperature.

*Example 3*

5 parts by weight of casein was heated with 100 parts by weight of water, 16 parts by weight of sulfur dioxide and 25 parts by volume of concentrated sulfuric acid at a temperature between 120° and 125° C. for 20 hours in a sealed glass vessel. Upon analysis the protein hydrolysate was found to have an amino nitrogen-total nitrogen ratio of 700, to contain tryptophane, and to be free of humin. The results of this experiment show that sulfurous acid may be used to make up a part of the hydrolyzing acid and that the presence of the sulfurous acid prevents destruction of trypotophane.

*Example 4*

A series of experiments was run in which the concentration of the sulfur dioxide was varied. In the first experiment 10 parts by weight of casein in 5 parts by weight of water and 2½ parts by volume of a 16% solution of sulfur dioxide was heated between 120 and 125° C. for 20 hours. In this run the sulfur dioxide-protein ratio was 0.38. In a second experiment the concentration of sulfur dioxide was doubled so that the sulfur dioxide-protein ratio was 1.52 and in the third the sulfur dioxide-protein ratio was 3.04. In each case the time and temperature were the same. Analysis of the hydrolysates showed that tryptophane was present and that no humin had been formed. The results also indicated that the higher the sulfur dioxide-protein ratio, the more complete was the hydrolysis of the protein.

*Example 5*

Another series of experiments similar to that of the preceding example was run with the sulfur dioxide-protein ratio within the range of the preceding example but with the temperature between 100 and 110° C. for a period of time of 48 hours. The degree of hydrolysis in this series was not as high as in the preceding series, indicating that the temperature of the hydrolysis should be at least 100° C. and preferably higher. In no case was humin found in the hydrolysate and tests showed the presence of tryptophane.

I claim:

1. A method of hydrolyzing proteins to obtain amino acids, including tryptophane, which comprises heating a proteinaceous material with an aqueous solution of sulfurous acid at a temperature within the range of 100° to 180° C. until the protein matter has been substantially hydrolyzed to amino acids.

2. A method of hydrolyzing poteinaceous materials to obtain amino acids, including tryptophane, which comprises the step of heating a proteinaceous material with a solution containing at least 5% by weight of sulfur dioxide based on the weight of the protein and another hydrolyzing acid at a temperature within the range 100° to 180° C. until the protein matter has been substantially hydrolyzed to amino acids.

3. A method of hydrolyzing casein to obtain amino acids, including tryptophane, which comprises the step of heating casein with an aqueous solution containing sulfurous acid at a temperature within the range 100° to 180° C. until the casein has been substantially hydrolyzed to amino acids.

4. A method of hydrolyzing casein to obtain amino acids, including tryptophane, which comprises the step of heating casein with an aqueous solution containing 5% by weight of sulfur dioxide based on the weight of the casein and another strong mineral acid within the range of 100° to 180° C. until the casein has been substantially hydrolyzed to amino acids.

5. A method of hydrolyzing proteinaceous materials to obtain amino acids, including tryptophane, which comprises the step of heating a proteinaceous material with a solution containing at least 5% by weight of sulfur dioxide based on the weight of the protein at a temperature within the range of 100° to 180° C. until the protein has been substantially hydrolyzed to amino acids and thereafter removing sulfur dioxide by subjecting the hydrolysate to the action of a vacuum.

ANTHONY M. MOOS.

REFERENCES CITED

The following references are of record in the file of this patent:

UNITED STATES PATENTS

| Number | Name | Date |
| --- | --- | --- |
| 2,384,388 | Monte et al. | Sept. 4, 1945 |

OTHER REFERENCES

Karrer, "Organic Chemistry," 1938, page 720.